F. M. SHONKWILER & J. THOMI.
CULTIVATING DEVICE.
APPLICATION FILED NOV. 8, 1910.
1,029,472.
Patented June 11, 1912.
3 SHEETS—SHEET 3.
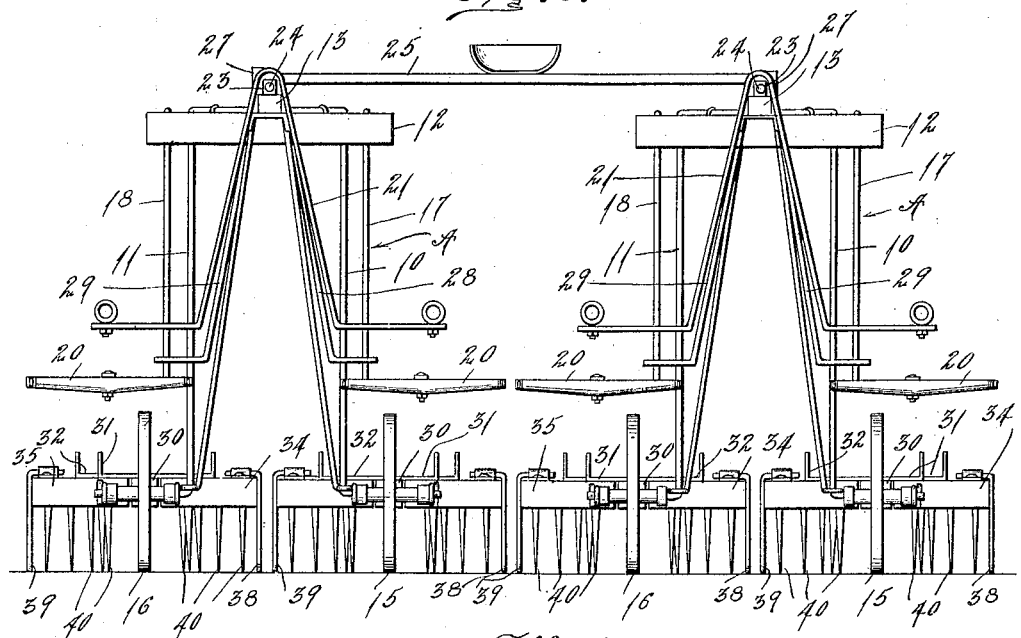
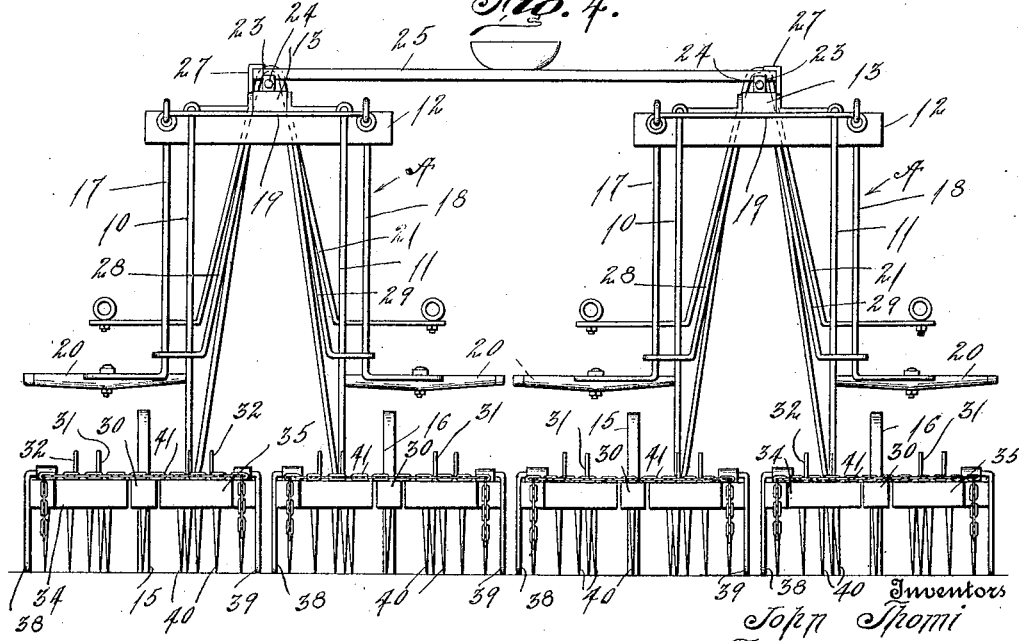

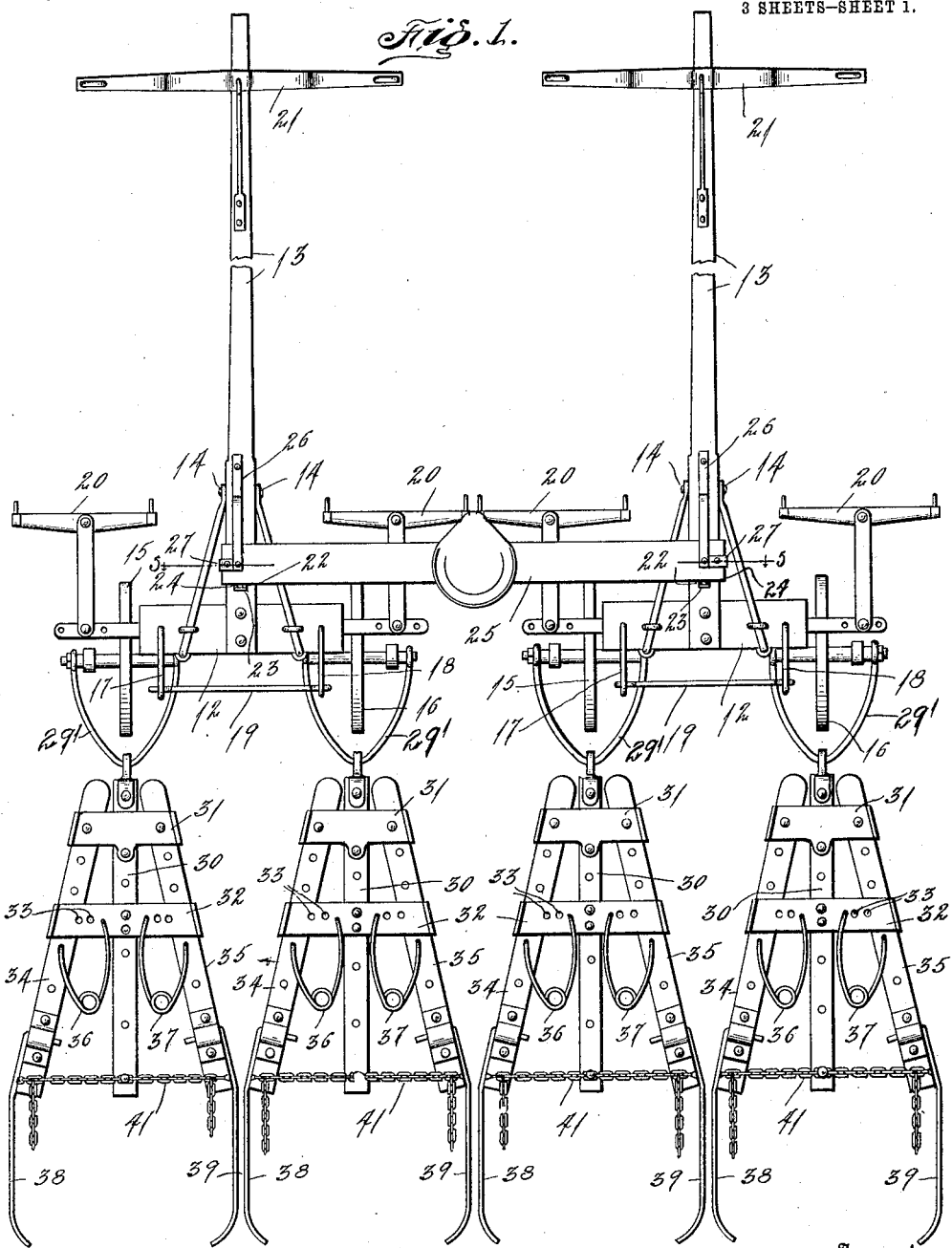

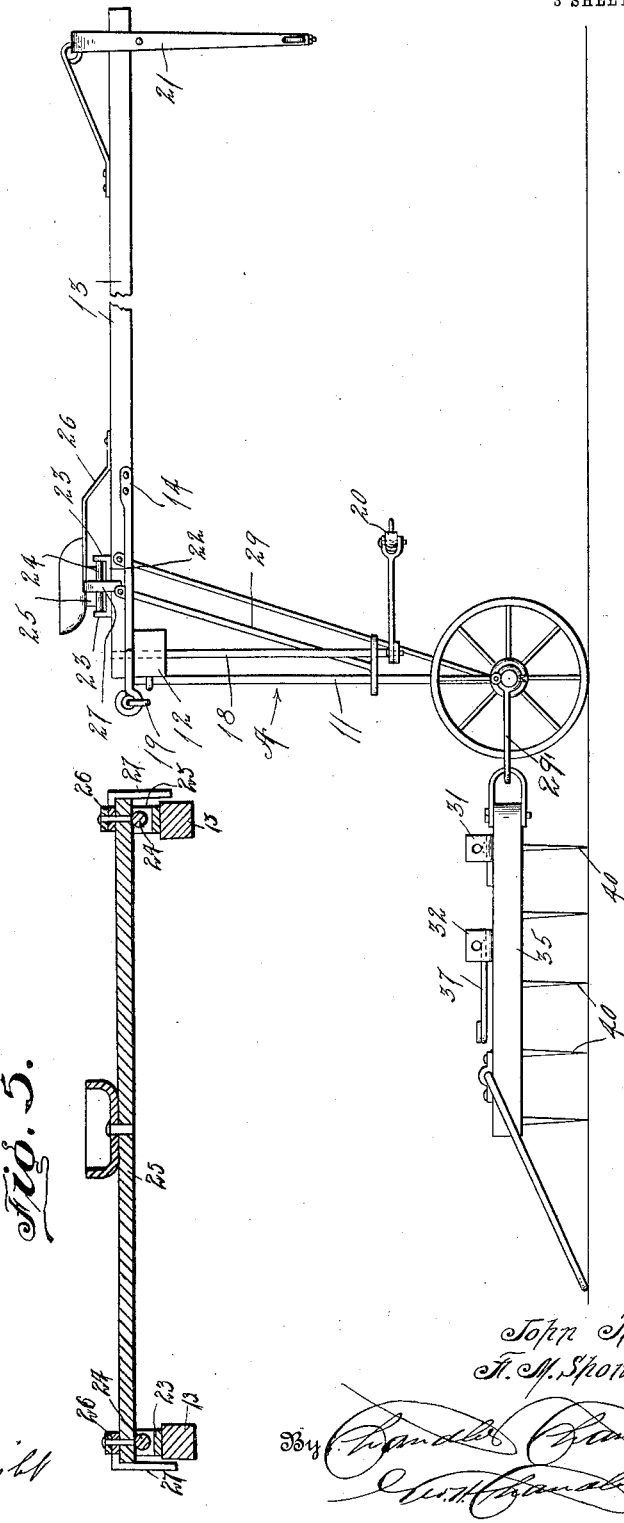

UNITED STATES PATENT OFFICE.

FRANCIS MARION SHONKWILER AND JOHN THOMI, OF BURNS, KANSAS.

CULTIVATING DEVICE.

1,029,472.　　　　　Specification of Letters Patent.　　Patented June 11, 1912.

Application filed November 8, 1910.　Serial No. 591,289.

*To all whom it may concern:*

Be it known that we, FRANCIS MARION SHONKWILER and JOHN THOMI, citizens of the United States, residing at Burns, in the county of Marion, State of Kansas, have invented certain new and useful Improvements in Cultivating Devices; and we do hereby declare the following to be a full, clear, and exact description of the invention, such as will enable others skilled in the art to which it appertains to make and use the same.

This invention relates to cultivating devices.

The object of the invention resides in the provision of a device of the character named which may be utilized for cultivating simultaneously between several adjacent rows of plants, and in so constructing the device that the portions thereof disposed between adjacent rows will automatically adjust themselves to variations in the distance between said rows, whereby injury to the plants themselves is prevented.

With the above and other objects in view, the invention consists in the details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views; and in which, Figure 1 is a plan view of the device constructed in accordance with the invention; Fig. 2, a side elevation of same; Fig. 3, a front view of the device; Fig. 4, a rear view of the device; and Fig. 5, a section on the line 5—5 of Fig. 1.

Referring to the drawings, the invention is shown as comprising a pair of transversely alined inverted U shaped frames A. These frames A are each formed of a pair of parallel vertical rods 10 and 11 connected together by means of a beam 12. Connected to each beam 12 is the rear end of a tongue 13, the rods 10 and 11 being extended forwardly of the beam 12 and connected to said tongue, as at 14. The rods 10 and 11 are bent outwardly at their lower ends to form axles, upon which are mounted traction wheels 15 and 16 respectively. Journaled in the ends of each beam 12 are vertical rods 17 and 18 which have their terminals bent at right angles to each other. The upper ends of these rods are connected together by means of a link 19, while the lower ends of each rod carry a swingletree 20. Secured to the forward end of each tongue 13, is a yoke 21, the intermediate portion of which is arched so as to bring its terminals in the proper relation with the swingletrees 20. By this construction, it will be apparent that suitable draft animals can be attached to the swingletrees 20 and that the pull exerted thereby will be equalized through the medium of the connecting link 19 between the upper ends of the vertically journaled rods 17 and 18. Each of the yokes 21 by reason of their formation can be secured at their terminals to the harness of the draft animals and serve to support the free end of the tongues 13. Mounted at corresponding points on the upper face of each of the tongues 13 is a plate 22 having its terminals bent upwardly to form spaced ears 23, and between these ears is pivoted a roller 24. Seated upon the rollers 24 is a beam 25 which is pivotally connected with the tongues 13 respectively by means of straps 26. Depending from each end of the beam 25 is an arm 27 which is adapted to engage the tongues 13 to limit their movement away from each other, while the straps 26 serve to limit the movement of said tongues toward each other. The vertical rods 10, 11, 17 and 18 are strengthened by means of brace members 28 and 29 respectively, which have one end secured to said rods respectively and their other end secured to the respective tongues. Secured to the laterally bent lower ends of the rods 10 and 11 of each frame A is a ball 29′ to which latter is adapted to be detachably connected a cultivating element. Each of these elements comprises a central beam 30 which has secured transversely thereof at its forward end a plate 31, the terminals of which are bent upwardly. Another plate 32 is secured to the beam 30 to the rear of the plate 31 and is provided with a plurality of apertures 33 disposed on opposite sides of the beam 30, and also has its terminals bent upwardly. A pair of side beams 34 and 35 have their forward ends pivotally connected to the plate 31 and are disposed on opposite sides of the beam 30. Each of the side beams 34 and 35 have secured thereto one end of springs 36 and 37 respectively, the other end of said springs being adapted for detachable engagement in the recesses 33, whereby the tension of the springs may be varied. Pivotally connected to the rear end of each of the beams 34 and 35 are controlling fingers 38 and 39 respectively. These fingers are adapted to engage the adjacent rows of plants as the device is moved so as to force the side beams 34 and 35 toward the central beam 30 against the influence of the springs 36 and 37 and thus automatically adjust said beams to variations in width between adjacent rows of plants. The outward movement of the beams 34 and 35 under the influence of the springs 36 and 37 is prevented beyond certain limits by means of chains 41 having their respective ends removably secured to the rear ends of respective beams 34 and 35.

From the foregoing it will be apparent that there has been produced a device by which several rows of plants may be simultaneously cultivated and which device is capable of automatically adjusting itself to the variations in width between the rows so as to prevent possible injury to the plants.

The side beams 34 and 35 of each cultivating attachment are provided with the usual depending cultivating teeth 40. The upturned ends of the plates 31 and 32 serve to hold a weight box disposed upon each cultivating element against lateral displacement from the element.

What is claimed is:—

1. In a device of the class described, the combination of a pair of transversely alined spaced inverted wheeled U shaped frames, a pair of tongues having their inner ends secured to the bight portions of said frames respectively, means connecting said tongues together and permitting a limited movement of the latter toward and away from each other, and a cultivating element secured to each of said frames.

2. In a device of the class described, the combination of a pair of transversely alined spaced inverted wheeled U shaped frames a pair of tongues having their inner ends recured to the bight portions of said frames respectively, a roller mounted at corresponding points on the upper face of each tongue, a beam supported upon said rollers, a pivotal connection between each tongue and beam, means carried by said beam for engaging said tongues to limit the movement of the latter away from each other, and a cultivating element secured to each of said frames respectively.

3. In a device of the class described, the combination of a pair of transversely alined spaced inverted wheeled U shaped frames, a pair of tongues having their inner ends secured to the bight portions of said frames respectively, a roller mounted at corresponding points on the upper face of each tongue, a beam supported upon said rollers, a pivotal connection between each tongue and beam, a depending arm carried by said beam at each end for engaging said tongues respectively to limit their movement away from each other, and a cultivating element secured to each of said frames respectively.

4. In a device of the class described, the combination of a pair of transversely alined spaced inverted wheeled U-shaped frames, a pair of tongues having their inner ends secured to the bight portions of said frames respectively, means connecting said tongues together and permitting a limited movement of the latter toward and away from each other, a vertical rod journaled in each end of the bight portion of each frame, each of said rods having their terminals bent at right angles to each other, and provided with means for connection to a swingletree, a pivotal connection between the upper ends of the vertical rods of each frame, and a cultivating element secured to each of said frames respectively.

5. In a device of the class described, the combination of a pair of transversely alined spaced inverted wheeled U shaped frames, draft connections carried by each frame, a pair of cultivating elements secured to each frame, each of said elements comprising a central beam, a plate secured transversely of said beam at its forward end and having upwardly extending terminals, a second plate secured to said central beam and provided with a plurality of perforations on opposite sides of the beam, and having its terminals bent upwardly, a pair of side beams having their forward ends pivoted to the first named plate on opposite sides of the central beam, a pair of springs each having one end removably engaged with a recess in the second named plate, and its other end engaging a respective beam at its rear end, a controlling finger pivoted to the rear end of each side beam for forcing the rear ends of the side beams toward the central beam by engagement of said finger with the product being cultivated, and a plurality of cultivator teeth depending from each of said side beams.

In testimony whereof we affix our signatures in presence of two witnesses.

F. MARION SHONKWILER.
JOHN THOMI.

Witnesses:
G. I. WATSON,
GUSS SCHEMPFF.

Copies of this patent may be obtained for five cents each, by addressing the "Commissioner of Patents, Washington, D. C."